United States Patent
Watanabe et al.

[11] Patent Number: 5,978,416
[45] Date of Patent: Nov. 2, 1999

[54] RECEIVING SYSTEM USING TRAINING PATTERN CORRELATION FOR IMPROVED SIGNAL RECEPTION

[75] Inventors: Hidekazu Watanabe, Tokyo, Japan; Seiichi Izumi, Fellbach; Hamid Amir-Alikhani, Leonberg, both of Germany

[73] Assignees: Sony Corporation, Tokyo, Japan; Sony United Kingdom Limited, Weybridge, United Kingdom

[21] Appl. No.: 08/796,069

[22] Filed: Feb. 4, 1997

[30] Foreign Application Priority Data

Jan. 30, 1996 [GB] United Kingdom ............ 9601760

[51] Int. Cl.[6] .................. H03K 5/159; H04B 1/10; H04L 7/00
[52] U.S. Cl. .................. 375/231; 375/350; 375/368
[58] Field of Search ................ 375/231, 232, 375/285, 346, 350, 365, 368, 357; 455/63, 296, 305; 333/28

[56] References Cited

U.S. PATENT DOCUMENTS

| | | |
|---|---|---|
| 4,646,173 | 2/1987 | Kammeyer et al. ............ 360/51 |
| 5,233,632 | 8/1993 | Baum et al. ............ 375/368 |
| 5,373,507 | 12/1994 | Skold ............ 375/365 |
| 5,434,889 | 7/1995 | Baier ............ 375/344 |
| 5,648,991 | 7/1997 | Namekata et al. ............ 375/341 |
| 5,748,686 | 5/1998 | Langberg et al. ............ 375/367 |

*Primary Examiner*—Stephen Chin
*Assistant Examiner*—Albert Park
*Attorney, Agent, or Firm*—Frommer Lawrence & Haug, LLP; William S. Frommer

[57] ABSTRACT

A transmission apparatus which can realize high demodulation efficiency even in the case where the channel characteristic is deteriorated. The same pattern data as those of the known pattern data contained in the transmitting data to be transmitted to the channel is generated on the receiving side and the correlation between said pattern data and the receiving data to be received through the channel is obtained. Then, the channel characteristic is successively estimated based on the correlation value and the receiving data will be demodulated depending upon said estimated result. Thus, since the channel characteristic can be estimated based on the receiving data, the data can be demodulated correctly even in the case where the receiving data is distorted due to the characteristic deterioration.

6 Claims, 5 Drawing Sheets

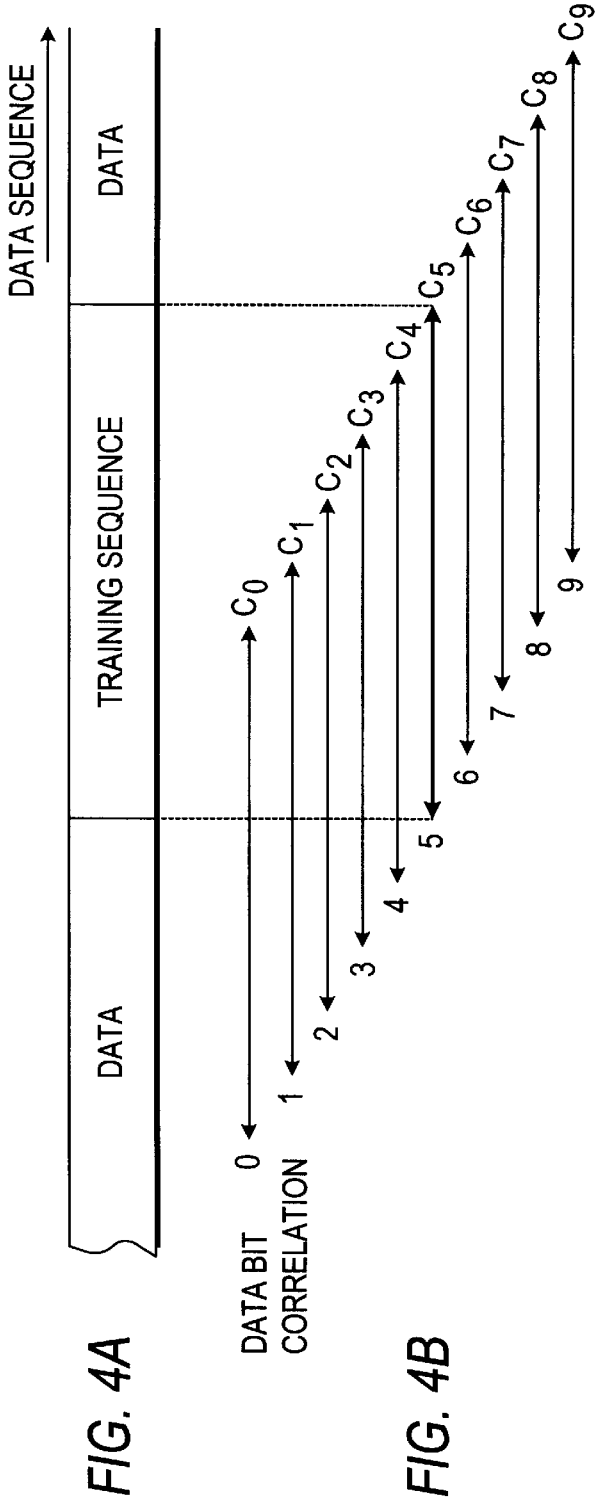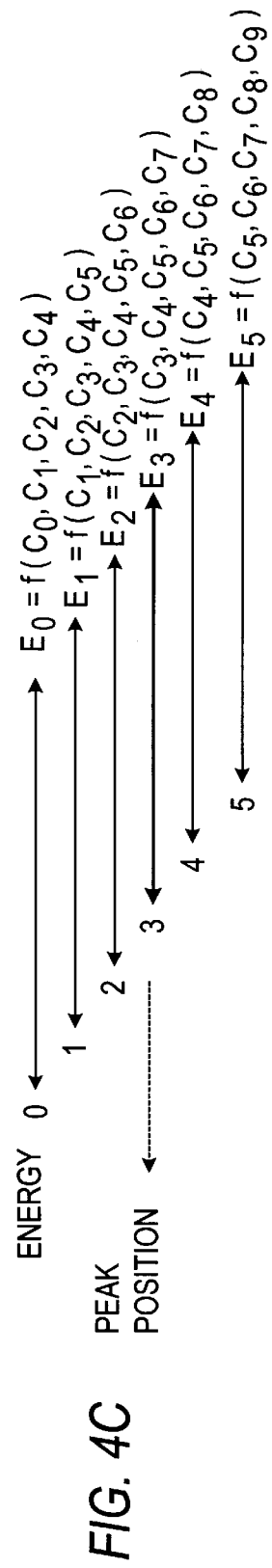
FIG. 4A
FIG. 4B
FIG. 4C

RECEIVING SYSTEM USING TRAINING PATTERN CORRELATION FOR IMPROVED SIGNAL RECEPTION

BACKGROUND OF THE INVENTION

1. Field of the Invention

This invention relates to a transmission apparatus and transmission method, and more particularly, is applicable to a digital cordless telephone and a receiving method to be used for this cordless telephone.

2. Description of the Related Art

At present various systems (digital cordless telephone system and digital automobile telephone system) are under examination in order to realize the digital mobile communication system in many countries. They are, such as, DECT (Digital European Cordless Telecommunications) and GSM (Groupe Specil de Mobile).

In the system, such as the digital automobile telephone in which the terminal moves at the high speed, the receiving signal is easily affected by fading due to the transmission channel condition, and receiving characteristic is apt to be degraded. Under these conditions, synchronization timing is deviated and the demodulation efficiency is apt to be worsened and also the bit error rate decreases. In this event, there was a possibility that the entire system synchronizing condition might be worsened.

SUMMARY OF THE INVENTION

In view of the foregoing, an object of this invention is to provide a transmission apparatus and transmission method which are more resistant to the distortion of channel as compared with the conventional apparatus.

The foregoing objects and other objects of the invention have been achieved by the provision of a transmission apparatus comprising: pattern generation means (4A) for generating the same pattern data as those of the known pattern data (ts) contained in the transmitting data to be transmitted to the transmission channel; correlation detection means (4A) for detecting successively the correlation between the receiving data ($r_k$) to be received through the transmission channel and the pattern data (ts) as the correlation values (CorrRS$_k$); and signal processing means (4A) for demodulating the receiving data ($r_k$) depending upon the estimated result after successively estimating the characteristic of the transmission channel based on the correlation values.

Furthermore, according to this invention, a transmission method comprises: a processing for obtaining the correlation between the pattern data (ts) and the receiving data ($r_k$) to be received through the transmission channel after generating the pattern identical with the known pattern data (ts) contained in the transmitting data to be transmitted to the transmission channel; and a processing for demodulating the receiving data ($r_k$) depending upon the estimated result after successively estimating the characteristic of the transmission channel depending upon the correlation values (CorrRS$_k$) obtained by the above mentioned processing.

The same pattern data as the known pattern data (ts) contained in the transmission data to be transmitted to the transmission channel is generated on the receiving side, and the correlation between the pattern data (ts) and the receiving data ($r_k$) to be received through the transmission channel is obtained. Then, the characteristic of the transmission channel is successively estimated depending upon the correlation values (CorrRS$_k$), and the receiving data ($r_k$) is demodulated depending upon the estimated result. Thus, the transmission apparatus and transmission method can be easily realized, in which even if the receiving data ($r_k$) is distorted by the characteristic deterioration, the data can be correctly demodulated.

The nature, principle and utility of the invention will become more apparent from the following detailed description when read in conjunction with the accompanying drawings in which like parts are designated by like reference numerals or characters.

BRIEF DESCRIPTION OF THE DRAWINGS

FIGS. 4A to 4C are schematic diagrams explaining the calculation of the correlation value and its energy average;

DETAILED DESCRIPTION OF THE EMBODIMENT

Preferred embodiments of this invention will be described with reference to the accompanying drawings:

(1) General Construction

Figure 1:
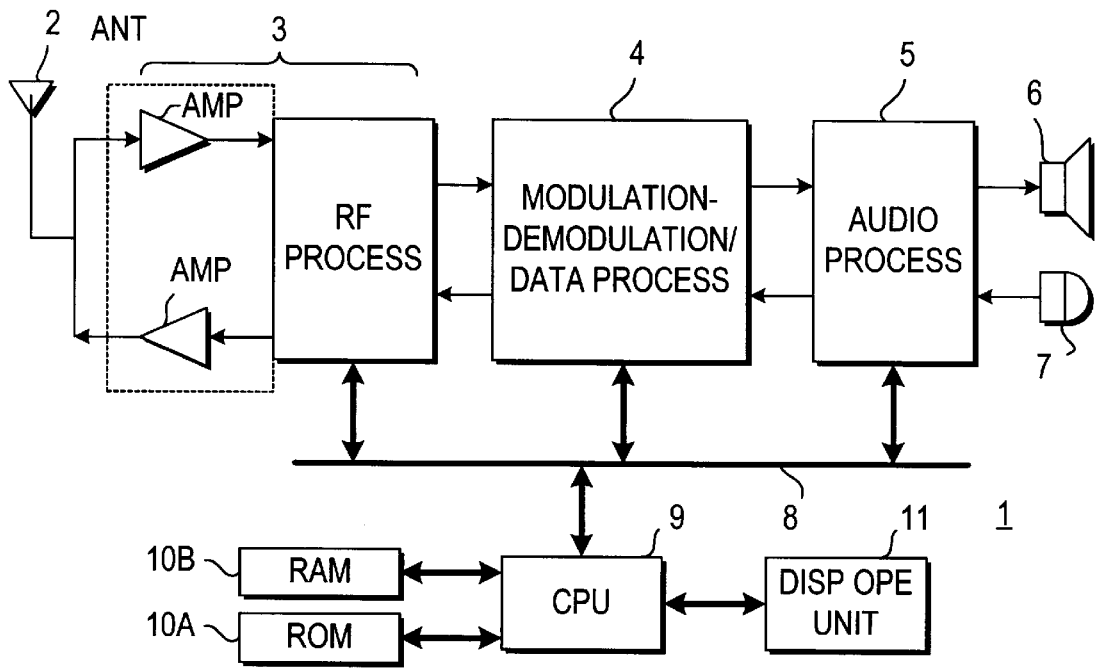
FIG. 1 is a block diagram showing one embodiment of transmission apparatus according to this invention.

At first, the general construction of a digital portable telephone will be described below. As shown in FIG. 1, a portable telephone 1 is constituted by various circuits, such as a high frequency (RF) signal processing circuit 3, a modulation-demodulation and data processing circuit 4, an audio processing circuit 5, besides a transmit-receive antenna 2. And while the audio signal transmitted is reproduced through a speaker 6, the voice of communicator is inputted through a microphone 7 and transmitted from the transmit-receive antenna 2.

At this point, processing circuits 3 to 5 are controlled by the central processing unit (CPU) 8 which is connected respectively to circuits 3 to 5 through bus 8. The CPU 9 functions based on the program stored in the read only memory (ROM) 10A and uses the random access memory (RAM) 10B as a calculation table. Also, the CPU 9 transmits and receives the data between a display operation unit 11 and has interface between communicators.

Figure 2:
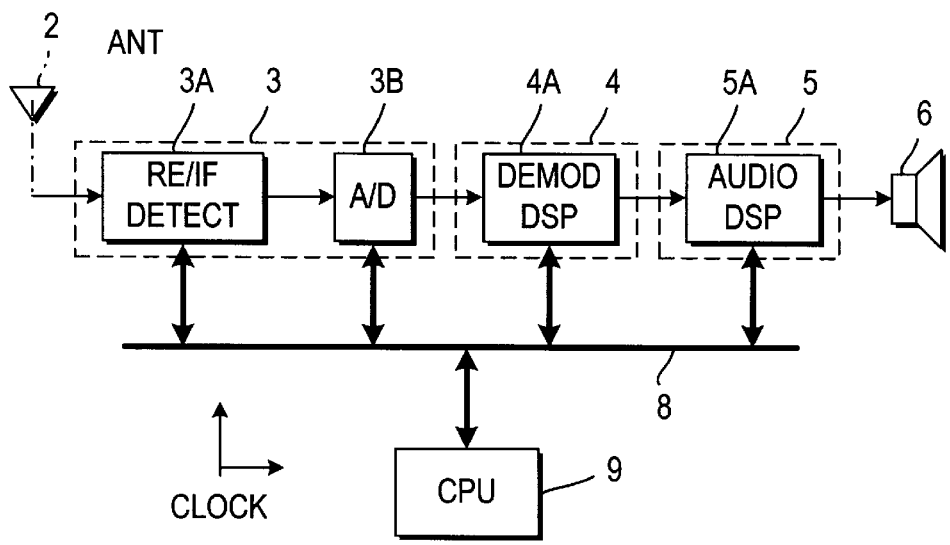
FIG. 2 is a block diagram showing a construction example of receiving unit of the transmission apparatus.

FIG. 2 shows more in detail the portable telephone 1 centering around the receiving system. High frequency (RF) signal processing circuit 3 high frequency amplifies the receiving signal by a RF/IF detection circuit 3A and orthogonally detects and converts this to the digital signal by an analog-to-digital (A/D) converter 3B. Then, the receiving data is given to the modulation-demodulation and data processing circuit 4.

The modulation-demodulation and data processing circuit 4 demodulates the data received by the signal processing at the digital signal processor (DSP) for demodulation 4A, and conducts the synchronizing processing, the equalizing processing, the demodulation processing and the error correction processing by the frequency correction channel (FCCH) and gives the demodulated data to the DSP for audio 5A. This audio DSP 5A is used to demodulate the compressed audio data.

Then, the principle of waveform equalization processing and demodulation processing by the DSP for demodulation 4A will be discussed in the following paragraphs.

(2) Demodulation Processing

Figure 3:
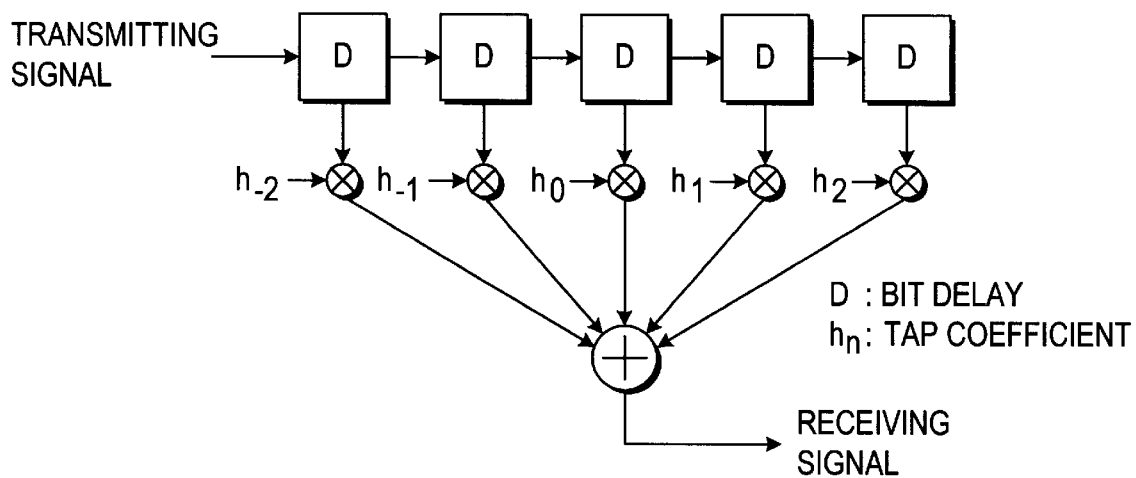
FIG. 3 is a brief linear diagram showing a fading model.

Fading occurs due to the fact that multiple reflection waves which are reflected at various placed and having different delay times are received as composite waves. As shown in FIG. 3, this state can be modeled with transversal type filter. This figure is expressed considering the time delay for up to 5 bits and $h_k$ shows the tap coefficient to determine the signal loudness corresponding to each delay time.

As it is apparent from FIG. 3, fading is shown as a sum of values multiplied data of every bit interval by the tap coefficient $h_k$. In other words, it can be said that fading is a result of convolution integral of each delayed bit and tap coefficient $h_k$. Accordingly, if the entire bit delay spread (in this case, 5 bits) can be specified, the characteristic of the transmission channel can be determined by obtaining tap coefficient $h_k$.

In order to remove the effect of fading on the portable telephone 1 side, signal must be returned to a state in which no fading exists by wave equalizing the signal received. Practically, if the value of tap coefficient $h_k$ to show the characteristic of the transmission channel can be found correctly, a filter with the opposite characteristic to the transmission channel characteristic can be constituted, and the effect of fading can be removed. Thus, in practice, how correctly the transmission channel characteristic can be estimated becomes very important technique for improving the receiving characteristic.

However, in the case of mobile communications, the transmission channel characteristic changes as the time proceeds, and in general it is not easy to estimate it correctly. However, in the automobile telephone system, such as the GSM system, since the time division multiple access is used as an accessing system, the unit transmission time to be allocated (i.e., 1 burst) to the transmitting data is as short as 580 [$\mu$sec] and the effect of fading in each burst can be considered to be almost constant.

In this embodiment, the tap coefficient $h_k$ is estimated in utilizing the known pattern data (training sequence) contained in the center of each burst. Several patterns can be considered in the training sequence. But if we pay attention only to a part of bit patterns in the known patterns having 26-bit length, the orthogonal relationship exists in the auto-correlation (AutoCorr$_k$) as shown in the following equation:

$$AutoCorr_k = \frac{1}{N}\sum_{i=0}^{N-1} ts_i \cdot ts_{i+k} \qquad (1)$$
$$= 1 \qquad (k=0)$$
$$= 0 \qquad (k \neq 0)$$

Here, ts shows training sequence.

Then, the receiving signal system $r_k$ can be expressed as follows using the transmitting signal system $s_k$ and the tap coefficient $h_k$:

$$r_k = \sum_{j=-L}^{L} h_j \cdot s_{k-j} \qquad (2)$$

It is apparent that based on the above two equations the correlation value CorrRS$_k$ between the training sequence ts and the receiving signal $r_k$ can be obtained as follows:

$$CorrRS_k = \frac{1}{N}\sum_{i=0}^{N-1} r_i \cdot ts_{i+k} \qquad (3)$$
$$= \frac{1}{N}\sum_{i=0}^{N-1}\left\{\sum_{j=-L}^{L} h_j \cdot s_{k-j}\right\} \cdot ts_{i+k}$$
$$= \frac{1}{N}\sum_{j=-L}^{L} h_j \sum_{i=0}^{N-1} s_{k-j} \cdot ts_{i+k}$$

At this point, if the bit pattern of receiving signal $r_k$ and the bit pattern of training sequence ts are the same, the following equation exists instead of equation (3) because of the orthogonality of the training sequence:

$$CorrRS_k = h_k \qquad (4)$$

More specifically, the tap coefficient can be obtained by calculating the correlation value CorrRS$_k$ between the receiving signal $r_k$ and the training sequence ts, and the characteristic of the transmission channel (channel response) can be estimated. Also by detecting the timing to get correlation peak, synchronization timing can be obtained. Thus, if the estimated channel response and the synchronization timing are used, data least affected by fading can be demodulated.

(3) Channel Response Estimation Method (3-1) Summary

The system of this invention is to estimate the characteristic of the transmission channel based on the principle described in the foregoing paragraph. The most simple example is to take the peak of correlation value as the synchronizing position and makes the correlation value at that point as a parameter (tap coefficient $h_k$) to regulate the characteristic of the transmission channel (channel response). The processing method which can further increase the detection accuracy of synchronizing position is discussed in the following paragraphs.

Figure 5:
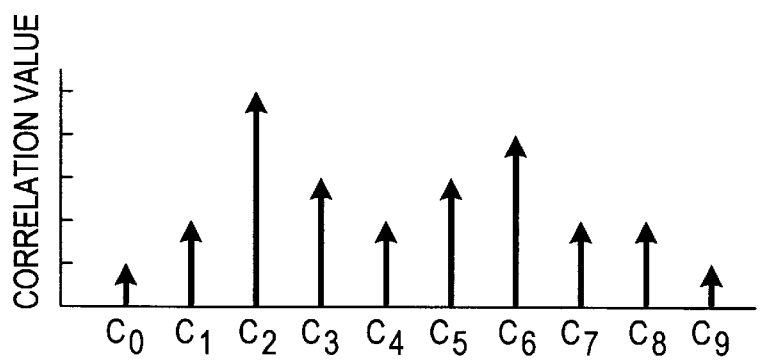
FIG. 5 is a schematic diagram showing the distribution of the correlation value.

In this embodiment, as shown in FIG. 4C, the energy average of correlation values CorrRS$_k$ which are obtained based on the equation (3) is obtained and the peak of this energy average is obtained to set the synchronization timing. As shown in FIG. 4B, in this case ten correlation values C0, C1 ... C9 are obtained and the synchronization timing is detected based on these. This is because to obtain the most suitable value in the case where multiple peak points are produced by the effect of fading as shown in FIG. 5. In this connection, in the case of calculating the average energy (moving average value), the correlation value is weighting calculated.

Figure 6:
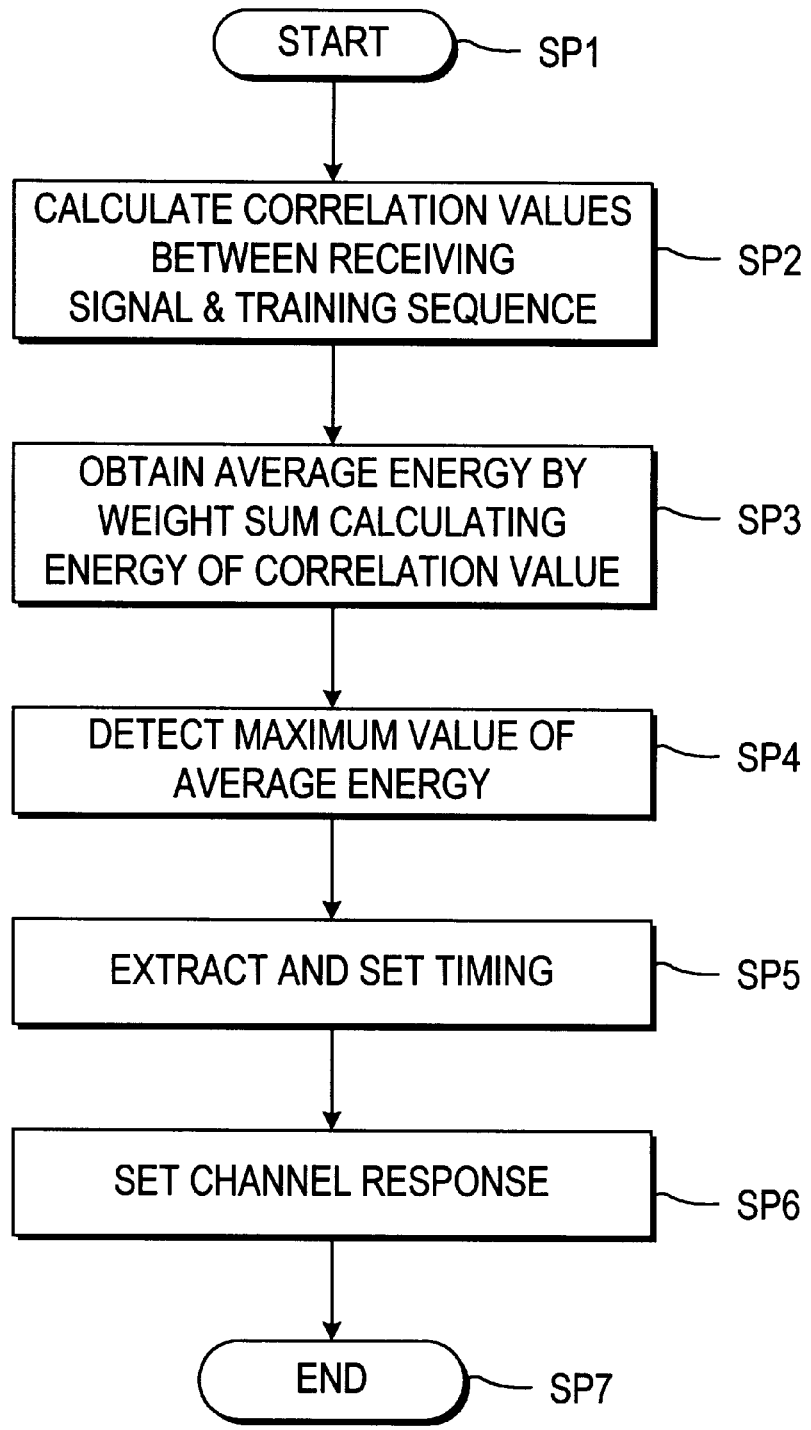
FIG. 6 is a flow chart showing the estimated procedure of the characteristic of the transmission channel.

The outline of calculation procedure of the channel response in utilizing this method will be hereinafter described using FIG. 6.

Firstly, if the estimation processing of the channel response is started from step SP1, at step SP2, such as ten correlation values between the receiving signal $r_k$ and the training sequence ts is calculated for example. The reason why it is sufficient to obtain ten correlation values C0, C1 ... C9 is that the synchronizing position is almost known in the case of portable telephone. Also, ten correlation values are values to be calculated exactly the same way as those of the tap coefficient $h_k$ to show the characteristic of the transmission channel; however, since these are used in case of confirming the synchronizing position, we will classify them different as a matter of convenience.

With this arrangement, if ten correlation values C0, C1 ... C9 are obtained, energy weighted sum of each correlation value is calculated and moving average values is obtained. In this embodiment, energy weighted sum of five correlation values is calculated and six sets of energy average values E0, E1 . . . E5 are obtained.

At the following step SP4, the maximum value of energy average values E0, E1 . . . E5 is detected and proceeds to the processing of step SP5. At this step SP5, the synchronization timing is extracted depending upon the detected position and the synchronization timing is set.

Then, at step SP6, the characteristic of the transmission channel is set by making a group of correlation values which provides the maximum value of energy average values as tap coefficients $h_0, h_1 \ldots h_4$, and these processing are terminated at step SP7.

In this connection, the digital signal processor for demodulation 4A obtains the reverse characteristic filter depending upon the channel response thus obtained, and demodulates the receiving data depending upon this.

(3-2) Estimated Processing Example

The concrete example of the estimated processing corresponding to the existence or non existence of fading will be hereinafter described.

In the case where no fading exists, the receiving signal $r_k$ coincides with the training sequence ts, and the correlation value $C_3$ is the peak point among ten correlation values. Accordingly, if the correlation value to give the peak point is detected, the position to provide the synchronization can be correctly detected.

However, in the case where fading exists, several peaks are produced in a series of correlation values and there are cases where the synchronizing position cannot be correctly obtained. Therefore, as described in the foregoing paragraph, by obtaining energy on the correlation value of each time point and sequentially obtaining these weighted average, the average energy of the correlation value to show the channel response is obtained.

In this embodiment the average energy $E_n$ is obtained depending upon the following equation:

$$E_n = W_{-2}|C_n| + W_{-1}|C_{n+1}| + W_0|C_{n+2}| + W_1|C_{n+3}| + W_2|C_{n+4}| \quad (5)$$

where, $|C_k|$ (k=n, n+1, . . . n+4) is the energy of correlation value $C_k$ (k=n, n+1, . . . n+4), $W_i$ is the coefficient for weighting. This coefficient $W_i$ (i=−2, −1, 0, 1, 2) has a kind of window like roles for obtaining the average energy of correlation value. Accordingly, windows having different characteristics can be obtained by changing the weighting coefficient.

More specifically, there are a large number of window profiles such as rectangular, triangular, raised-cosine, etc. At this point, simply a triangular window is used as an example, and each coefficient $W_i$ (i=−2, −1, 0, 1, 2) is set as following equation:

$$W_0 = 8, W_{\pm 1} = 7, W_{\pm 2} = 6 \quad (6)$$

Then, assuming that five 5 correlation values are $C_0=3$, $C_1=5, C_2=10, C_3=6, C_4=2$, where n=0, the average energy $E_0$ can be obtained as follows:

$$E_0 = 6 \times 3 + 7 \times 5 + 8 \times 10 + 7 \times 6 + 6 \times 2 = 187 \quad (7)$$

This calculation is conducted on the other average energy $E_1, E_2, E_3, E_4$ (step SP3), and thus, synchronizing position is detected by detecting these peak energy (steps SP4, SP5).

At this point, a result of the case of obtaining the synchronization timing in utilizing the foregoing method and a result of the case of obtaining the synchronization timing by simply detecting the peak of correlation energy is compared and the difference between two results is confirmed.

Provided that the result of correlation values to be obtained is $C_0=1, C_1=2, C_2=5, C_3=3, C_4=2, C_5=3, C_6=4, C_7=2, C_8=2, C_9=1$. And FIG. 5 shows this.

As it is apparent from FIG. 5, in the case of obtaining the synchronization timing by detecting simply the peak of correlation values, the correlation value becomes the maximum value at the correlation value $C_2$ (=5). Thus, if this method is used, the timing of correlation value $C_2$ is set as the correct synchronization timing. In this case, the tap coefficient $h_k$ to regulate the channel response is as follows:

$$h_2 = C_0, h_1 = C_1, h_0 = C_2,$$
$$h_{-1} = C_3, h_{-2} = C_4 \quad (8)$$

However, according to the actual channel response, as shown in FIG. 5, the other peak which is almost as large as $C_2$ is seen in the vicinity of correlation value $C_6$. Therefore, if the receiving data is equalized paying no regard to this, the decline of bit error rate would be prospected.

On the other hand, in the case of obtaining the average energy, if six average energies $E_0, E_1, E_2, E_3, E_4, E_5$ are obtained from ten correlation values $C_n$, the following values are obtained:

$$E_0 = 93, E_1 = 103, E_2 = 112, E_3 = 96,$$
$$E_4 = 91, E_5 = 82 \quad (9)$$

The peak of these average energies is $E_2 = 112$ and this is the weighted sum of correlation values $C_2$ to $C_6$. Accordingly the timing at which the middle correlation value $C_4$ is obtained in five correlation values is adopted as the synchronization timing.

Thus, the tap coefficient $h_k$ to regulate the channel response can be set as follows:

$$h_2 = C_2, h_1 = C_3, h_0 = C_4,$$
$$h_{-1} = C_5, h_{-2} = C_6 \quad (10)$$

The result thus obtained includes correlation values $C_2$ and $C_6$ which provide two peaks as tap coefficients, and it can be considered to be very close to the actual channel response although there are some errors as compared with the method of just detecting the peak. Accordingly, if the receiving data would be demodulated based on this tap coefficient, it is considered that the receiving data can be demodulated with the lower bit error rate as compared with the previous method. Also, the latter example is more suitable for setting the synchronization timing.

Figure 7:
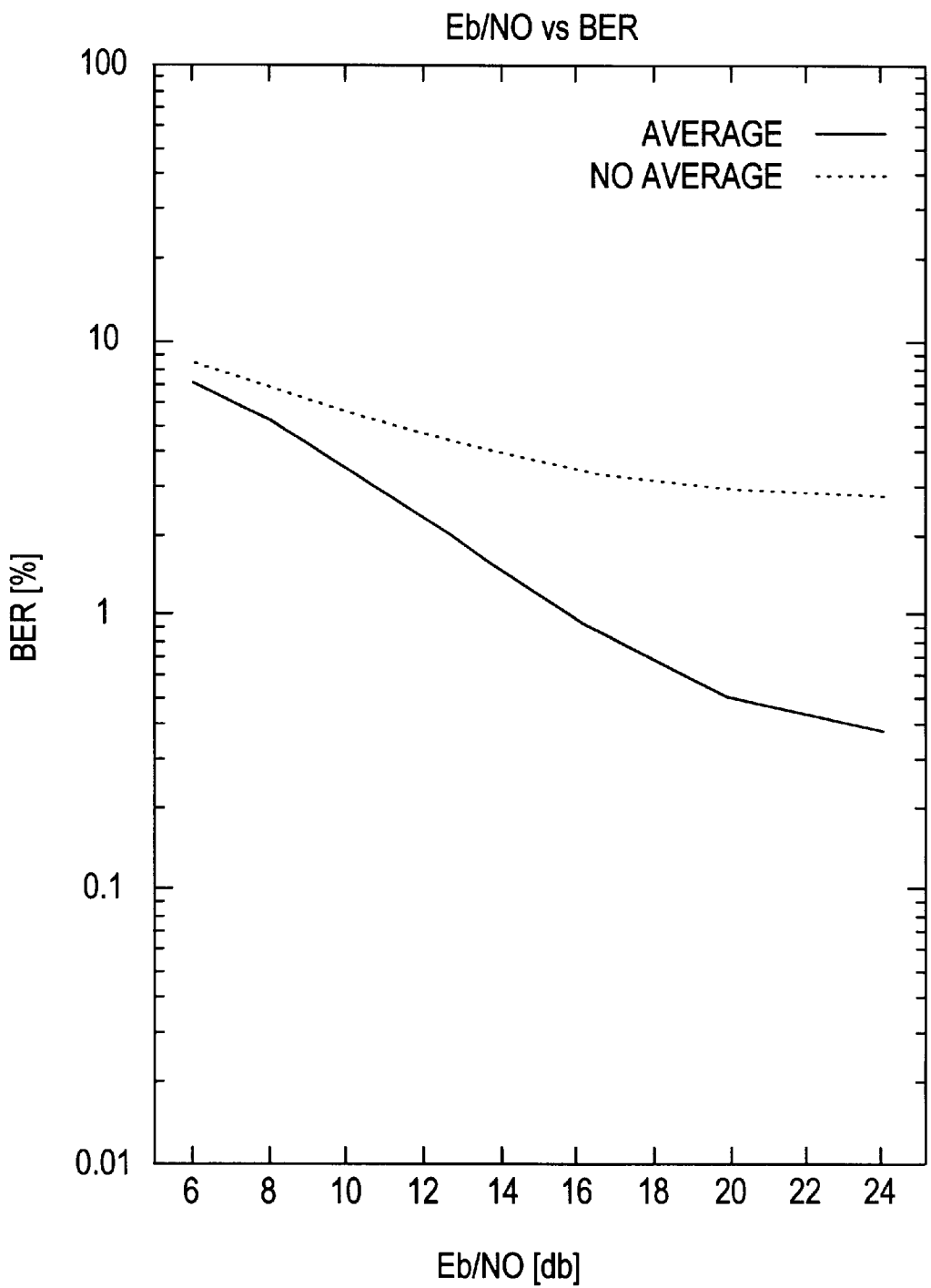
FIG. 7 is a characteristic curvilinear diagram showing the noise vs. energy ratio per bit.

This can be confirmed by FIG. 7. In this figure, the ordinate shows the bit error rate and the abscissa shows the noise vs. energy ratio per bit. As shown in this figure, it is apparent that the ratio of energy per bit vs. noise becomes higher, the bit error rate decreases at the time when the synchronization timing is set in utilizing the average energy (solid line).

According to the foregoing construction, in the case of receiving the transmitting data comprising the known bit pattern (training sequence), the correlation value between the receiving data and the preset bit pattern (training sequence) is obtained at the portable telephone 1 side, and by estimating the channel response on the receiving channel based on the maximum correlation value, the effect of fading can be removed.

Furthermore, the average energy on multiple correlation values to be obtained in time series is successively obtained in every fixed period of time, and by estimating the channel response on the receiving channel based on a set of correlation values which gives the maximum average energy among them, the effects of fading is further reduced.

As a result, even in the case where the receiving signal is distorted by the effect of fading, etc., the receiving timing can be correctly extracted. And thus, a portable telephone which is capable of detecting the synchronizing condition and hard to be deviated from the synchronizing condition can be easily obtained.

Furthermore, the equalizing characteristic can be improved by improving the synchronizing characteristic and as a result, the demodulation efficiency of the data can be improved. And thus, a portable telephone capable of further decreasing the bit error rate can be obtained.

(4) Other Embodiments

The embodiment described above has dealt with the case of obtaining the correlation value as the scalars value (one-dimensional value). However, this invention is not only limited to the above but also widely applicable to the case of obtaining it as the vector value (two-dimensional value).

Furthermore, the embodiment described above has dealt with the case of the portable telephone. However, this invention is not only limited to the above but also applicable to the other receiving devices, such as an automobile telephone.

Furthermore, the embodiment described above has dealt with the case of receiving devices. However, this invention is not only limited to the above but also widely applicable to reproducing devices for reproducing data which is high density recorded from the recording medium.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A receiving apparatus for receiving signals over a transmission channel, comprising:

pattern generation means for generating a local training pattern signal that matches a training pattern signal that is transmitted over said channel by a transmitter;

correlation means for correlating a received training pattern signal with said local training pattern signal to generate a correlation result, wherein said received training pattern signal is said training pattern signal as modified by the effects of said transmission channel; and processing means for operating on each of a multiple of sub-portions of said correlation result by weighting the sub-portion according to a weighting window to generate a weighted sub-portion of said correlation result and determining an average value for said weighted sub-portion, and for demodulating received signals according to a maximum of said average values.

2. The receiving apparatus as set forth in claim 1, wherein the processing means demodulates the signals received by said apparatus by setting a synchronization timing of the apparatus according to the position within said correlation result of said sub-portion corresponding to said maximum of said average values.

3. The receiving apparatus as set forth in claim 1, wherein said transmission channel includes a recording medium.

4. A method for receiving signals over a transmission channel, comprising the steps of:

generating a local training pattern signal that matches a training pattern signal that is transmitted over said channel by a transmitter;

correlating a received training pattern signal with said local training pattern signal to generate a correlation result, wherein said received training pattern signal is said training pattern signal as modified by the effects of said transmission channel;

processing each of a multiple of sub-portions of said correlation result by weighting the sub-portion according to a weighting window to generate a weighted sub-portion of said correlation result;

determining an average value for each said weighted sub-portion; and demodulating received signals according to a maximum of said average values.

5. The method as set forth in claim 4, wherein said demodulating includes setting a synchronization timing according to the position within said correlation result of said sub-portion corresponding to said maximum of said average values.

6. The method as set forth in claim 4, wherein said transmission channel includes a recording medium.

* * * * *